US012533677B2

(12) United States Patent
Ellson

(10) Patent No.: US 12,533,677 B2
(45) Date of Patent: Jan. 27, 2026

(54) THERMAL ADAPTER FOR AUTOMATED THERMAL CYCLING

(71) Applicant: Labcyte Inc., San Jose, CA (US)

(72) Inventor: Richard N. Ellson, Brea, CA (US)

(73) Assignee: Labcyte Inc., San Jose, CA (US)

( * ) Notice: Subject to any disclaimer, the term of this patent is extended or adjusted under 35 U.S.C. 154(b) by 450 days.

(21) Appl. No.: 18/014,354

(22) PCT Filed: Aug. 30, 2021

(86) PCT No.: PCT/US2021/048277

§ 371 (c)(1),
(2) Date: Jan. 4, 2023

(87) PCT Pub. No.: WO2022/047327

PCT Pub. Date: Mar. 3, 2022

(65) Prior Publication Data

US 2023/0249191 A1 Aug. 10, 2023

Related U.S. Application Data

(60) Provisional application No. 63/072,838, filed on Aug. 31, 2020.

(51) Int. Cl.
*B01L 7/00* (2006.01)
*B01L 3/00* (2006.01)

(52) U.S. Cl.
CPC ............. *B01L 7/52* (2013.01); *B01L 3/50853* (2013.01); *B01L 2200/16* (2013.01); (Continued)

(58) Field of Classification Search
CPC ........................... B01L 7/52; B01L 2300/0829
See application file for complete search history.

(56) References Cited

U.S. PATENT DOCUMENTS 10,156,499 B1 12/2018 Stearns
2012/0325797 A1 12/2012 Furuya et al.
(Continued)

FOREIGN PATENT DOCUMENTS

EP 3546949 10/2019
JP 2003-336553 11/2003
(Continued)

OTHER PUBLICATIONS

International Search Report and Written Opinion, PCT/US2021/048277, Labcyte Inc., 13 pages (Jan. 10, 2022).
(Continued)

*Primary Examiner* — Natalia Levkovich
(74) *Attorney, Agent, or Firm* — Merchant & Gould P.C.

(57) ABSTRACT

Systems and methods for processing samples in a multi-well reaction vessel can include inserting a multi-well reaction vessel into a heating chamber of a thermal cycler, enclosing the multi-well reaction vessel in the heating chamber, and compressing a bottom surface of the multi-well reaction vessel into a compliant thermally conductive insert to increase a thermal contact area between the bottom surface and the compliant thermally conductive insert. The compliant thermally conductive insert can be placed between the multi-well reaction vessel and a heating element of the thermal cycler, where heat flux from the heating element passes through the compliant thermally conductive insert to the reaction vessel. The compliant thermally conductive insert can include an elastically deformable creped graphite sheet that can reversibly deform according to different compression profiles depending on the topography or flexure of the reaction vessel and/or heating element.

20 Claims, 8 Drawing Sheets

(52) U.S. Cl.
CPC .................. *B01L 2300/0829* (2013.01); *B01L 2300/1805* (2013.01); *B01L 2400/0436* (2013.01)

(56) References Cited

U.S. PATENT DOCUMENTS

| | | | |
|---|---|---|---|
| 2014/0179566 | A1 | 6/2014 | Linton et al. |
| 2019/0070611 | A1 | 3/2019 | Schlaubitz et al. |
| 2020/0224936 | A1 | 7/2020 | Sadri et al. |

FOREIGN PATENT DOCUMENTS

| | | | |
|---|---|---|---|
| JP | 6-012133 | | 10/2016 |
| WO | 2003106179 | | 12/2003 |
| WO | 2007035642 | | 3/2007 |
| WO | 2016061592 | | 4/2016 |
| WO | 2019142082 | A1 | 7/2019 |

OTHER PUBLICATIONS

Anonymous, "Spreadershield-FLX (TM) Heat Spreaders," pp. 1-2 (Apr. 26, 2018).
Anonymous, "Tgon (TM) 800 Series Electrically and Thermally Conductive Interface Pad," pp. 1-2 (Nov. 1, 2009).

THERMAL ADAPTER FOR AUTOMATED THERMAL CYCLING

CROSS-REFERENCE TO RELATED APPLICATIONS

This application claims the benefit of and priority to U.S. Provisional Patent Application No. 63/072,838, filed Aug. 31, 2020, the entire contents of which are incorporated herein by reference.

BACKGROUND

Common commercial systems for amplification of DNA are based on polymerase chain reaction (PCR) which is typically based on an enzyme that activates above a predetermined temperature and then deactivates below a predetermined temperature. In many applications, this cycle is repeated multiple times. For example, in a PCR method that quantitates the amount of DNA, referred to as qPCR, the cycling between the upper and lower temperature may occur 40 or more times. Hence, reducing the time to achieve the desired activation and deactivation temperatures is an important factor in productivity for the method.

Processing many samples at once in a manner that is compatible with automation is also desired. Many commercial PCR reactions are performed in parallel with multiple reaction vessels combined in a regular array, such as a 96-well microplate. Less common are higher-density microplates with 1536 wells for use in commercial PCR thermal cyclers. One conventional strategy for reducing the time to cycle between the upper and lower temperatures for microplates involves the use of customized heating blocks having an "egg carton" shape to match similarly shaped bottom surfaces of specialized multi-well microplates. This approach improves heat transfer to the plate and within the plate itself, but requires tight specifications to maintain physical thermal contact by matching the shape of a thermally conductive, non-compliant metal heating block (often aluminum) with a plastic injection molded microplate or an expensive composite plate. However, such plates are difficult to mold to precise dimensions, may be fabricated from non-identical mold cavities and prone to warp (either after leaving the mold or after the PCR thermal cycling) due to the stresses from the different materials' response to temperature.

One disadvantage of multi-well plates designed for PCR thermal cycling is that, being purpose-built to maximize heat transfer, they generally fail to meet the requirements for use with acoustic ejection or acoustic interrogation, both highly desired attributes for process automation. Sample transfer methods using acoustic radiation (i.e., acoustic pressure waves) have been described in, e.g., U.S. Pat. No. 10,156,499, which is hereby incorporated by reference. However, plates that are acoustically compatible generally fail to meet the physical requirements (e.g., surface area, thinness, durability against heat-induced deformation) needed to provide the rapid temperature changes of PCR thermal cycling. As these plates deviate from flatness due to bow across their wells on the order of a few hundred microns, they do not provide uniform thermal coupling to PCR heating blocks. Furthermore, the plates are not sufficiently compliant to enable uniform thermal coupling even with large compressive forces. Therefore, there is interest in providing a solution that enables both manual and automated (robotic) manipulation of microplates into such a system that can provide for rapid thermal cycling as well as automated sample handling.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a system for sample handling for multi-well reaction vessels can include a robotic sample handler configured to retain and move a multi-well reaction vessel, and a thermal cycler for performing thermal cycling operations on samples contained in the reaction vessel. The thermal cycler includes a heating chamber shaped for receiving the multi-well reaction vessel that contains a heating element, a compliant thermally conductive insert positioned adjacent the heating element, and a closing mechanism that, when closed, presses the multi-well reaction vessel toward the compliant thermally conductive insert and the heating element. According to at least one embodiment, the compliant thermally conductive insert can be formed of an elastically deformable creped graphite sheet, or an assembly of any suitable number of parallel graphite sheets, that have high thermal conductivity and are reversibly deformable.

The compliant thermally conductive insert can accommodate a mismatch between a geometry of a bottom surface of the multi-well reaction vessel and a top surface of the heating element by reversibly deforming when compressed between the two. This effect can compensate for nonparallel flat or curved surfaces, for surface imperfections, or for changes in surface profile caused by deformation during a thermal cycle. In the context of an automated system with a controller, the system can cause the robotic sample handler to insert the multi-well reaction vessel into the thermal cycler, enclose the multi-well reaction vessel in the heating chamber, and compress a bottom surface of the multi-well reaction vessel into the compliant thermally conductive insert by the closing mechanism. The system can then cause the thermal cycler to automatically cycle the multi-well reaction vessel in the heating chamber by the heating element by applying a controlled heat flux to the multi-well reaction vessel from the heating element through the compliant thermally conductive insert.

The thermal cycling process steps can be performed with multi-well reaction vessels that are designed for automated acoustic sample handling, and the system can therefore utilize acoustic sample transfer and acoustic sample interrogation techniques to populate a multi-well reaction vessel from a source vessel by acoustic ejection, or to analyze aspects of a sample by acoustic interrogation before or after thermal cycling. In addition, the system can utilize acoustic sample transfer techniques to transfer samples from the multi-well reaction vessel to a sample analyzer after thermal cycling.

According to certain embodiments of the present disclosure, a method for sample handling for multi-well reaction vessels can include inserting a multi-well reaction vessel into a heating chamber of a thermal cycler by placing the multi-well reaction vessel on a compliant thermally conductive insert on a heating element of the thermal cycler. The compliant thermally conductive insert can include one or more elastically deformable creped graphite sheets laid singly or in parallel that have high thermal conductivity and are reversibly deformable. The compliant thermally conductive insert can accommodate a mismatch between a geometry of a bottom surface of the multi-well reaction vessel and a top surface of the heating element by reversibly deforming when compressed between the two. This effect can compensate for nonparallel flat or curved surfaces, for surface imperfections, or for changes in surface profile caused by deformation during a thermal cycle.

Methods described herein can further include compressing a bottom surface of the multi-well reaction vessel into the compliant thermally conductive insert to increase a thermal contact area between the bottom surface and the compliant thermally conductive insert, and thermally cycling the multi-well reaction vessel in the heating chamber by applying a controlled heat flux to the multi-well reaction vessel by the heating element through the compliant thermally conductive insert. The compliant thermally conductive insert can maintain the increased contact area throughout a thermal cycling operation even if the multi-well reaction vessel or the heating element deform during the repeated heating and cooling stages of the cycle. Optionally, a compliant thermally conductive insert could be used between the top surface of the multi-well reaction vessel and the upper surface of the heating chamber if the multi-well reaction vessel requires improved thermal contact between these surfaces.

According to certain embodiments of the present disclosure, a thermal cycler assembly for use in sample handling for multi-well reaction vessels can include a heating chamber, a heating element contained in the heating chamber, and a closing mechanism that, when closed, encloses the multi-well reaction vessel in the heating chamber and presses on the multi-well reaction vessel to compress it into a compliant thermally conductive insert positioned in the heating chamber in contact with the heating element. According to various embodiments, the compliant thermally conductive insert includes an elastically deformable creped graphite sheet, or an assembly of multiple deformable creped graphite sheets having high thermal conductivity and that are partly or fully reversibly deformable.

According to certain embodiments of the present disclosure, a method for sample handling for multi-well reaction vessels can include inserting a first multi-well reaction vessel into a heating chamber of a thermal cycler by placing the multi-well reaction vessel on a compliant thermally conductive insert on a heating element of the thermal cycler, removing the first multi-well reaction vessel, and subsequently inserting a second multi-well reaction vessel into the heating chamber of the thermal cycler by placing the second multi-well reaction vessel on the compliant thermally conductive insert. The compliant thermally conductive insert can include an elastically deformable creped graphite sheet or an assembly of elastically deformable creped graphite sheets with high thermal conductivity. When the first multi-well reaction vessel is compressed into the compliant thermally conductive insert, pressure between the first bottom surface and the heating element causes reversible deformation of the creped graphite sheet according to a first compression profile. Likewise, when the second multi-well reaction vessel is compressed into the compliant thermally conductive insert, pressure between the second bottom surface and the heating element causes reversible deformation of the creped graphite sheet according to a second compression profile that differs from the first compression profile. The compliant thermally conductive insert reverts to an uncompressed state from the first compressed profile and from the second compressed profile without permanently deforming or "flowing" in response to pressure and reversible deformation.

BRIEF DESCRIPTION OF THE DRAWINGS

Various embodiments in accordance with the present disclosure will be described with reference to the drawings, in which.

DETAILED DESCRIPTION

Figure 1:
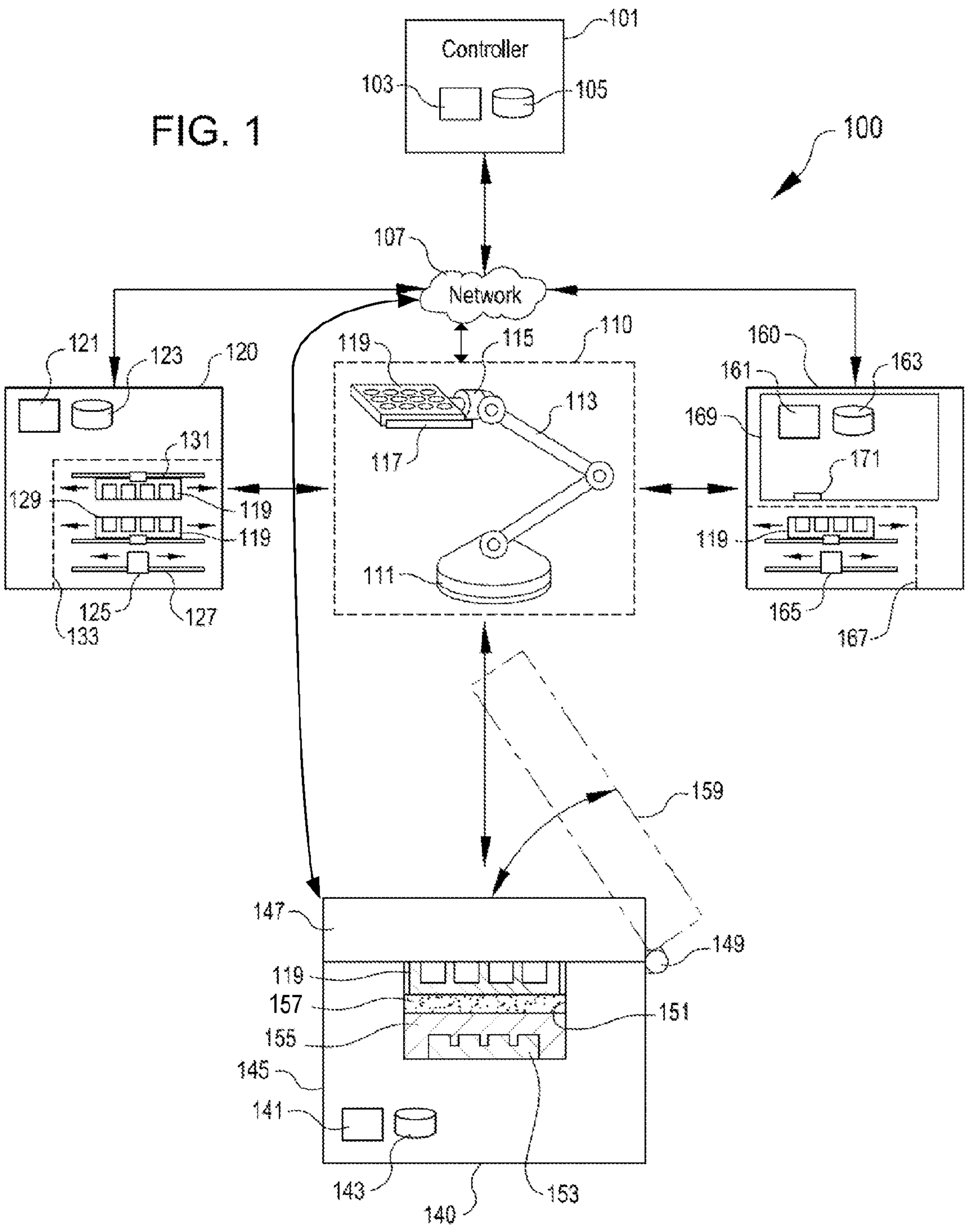
FIG. 1 is a simplified block diagram illustrating an example system for sample handling for multi-well reaction vessels, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

In thermal cyclers, non-uniform thermal coupling between a sample-containing multi-well reaction vessel and the heating element is most associated with air being in between the heating block surface and the well bottom surfaces on the microplate. Where non-uniform thermal coupling occurs, this means that some wells with air space will not experience heat flux at the same level as adjoining wells where there is an air space. Heat flux through conventional microplate materials (such as polymers like polypropylene, cyclo-olefins, and the like) cannot provide sufficient lateral heat flux through the microplate to spread the heat quickly within the microplate and support fast thermal cycling for the wells not in contact with the heating block. Flattening the plate to get thermal contact generally fails to alleviate the air-space problem.

Automation of thermal cycling processes can be greatly enhanced by utilizing acoustic sample handling. However, acoustic interrogation and acoustic sample ejection pose an engineering challenge in the context of "egg carton" multi-well reaction vessels common for PCR and other procedures that require thermal cycling. The use of flat-bottomed acoustically compatible multi-well reaction vessels with flat heating element blocks has been considered, but is also ineffective. Producing acoustically compatible plates with "perfectly flat" bottom surfaces, or that are "reproducibly flat" to within a compliant range when compressed against the flat block of a conventional PCR system, is cost prohibitive. Greater flexibility in the plastic materials is also likely to have detrimental effects on acoustic microplates, as material stiffness is correlated with acoustic performance. In particular, more compliant materials tend to have larger acoustic attenuation. Also, higher compliance materials often undergo larger deformations to the stresses from thermal cycling and potentially lead to failures when handled by automated plate handling robots due to bowing of the microplate.

The described embodiments of the invention describe systems and methods for sample handling for multi-well reaction vessels. According to various embodiments, such systems can include a robotic sample handler that retains and moves a multi-well reaction vessel for automated insertion into and/or removal from a thermal cycler for performing thermal cycling operations on samples contained in the reaction vessel, such as but not limited to PCR. A thermal cycler for use with such systems can include a heating chamber shaped for receiving the multi-well reaction vessel that contains a heating element, a compliant thermally conductive insert positioned adjacent the heating element, and a closing mechanism that, when closed, presses the multi-well reaction vessel toward the compliant thermally conductive insert and the heating element. According to at least one embodiment, the compliant thermally conductive insert is a deformable solid with lateral thermal conductivity greater than the that of the surface of the heating element. According to specific embodiments, the compliant thermally conductive insert can be formed of an elastically deformable creped graphite sheet, or an assembly of any suitable number of parallel graphite sheets, that have high thermal conductivity and are reversibly deformable.

Turning to the figures, in which like reference numerals indicate related elements, FIG. 1 is a simplified block diagram illustrating an example system 100 for sample handling for multi-well reaction vessels, in accordance with various embodiments of the present disclosure.

The system 100 includes a controller 101, which can be a computer system operating from one or more processors 103 and nontransitory memory devices 105 that contain the executable instructions that control automated tasks by the system. Note that the controller 101 can be distributed or centralized, may be cloud-based, or may operate from one or more of the on-board controllers of the various assemblies described herein. Further, certain portions of the system 100 described below may be operated manually or otherwise separated from an automated system including any suitable subset of the assemblies described herein. Control by the controller 101 over the system elements can be effected via a network 107, which may be a wired or wireless network.

In accordance with at least one embodiment, the system 100 includes one or more of an acoustic sample handler 120, thermal cycler 140, and analyzer assembly 160. These system elements may be automatically controlled by, e.g., the controller 101, or may be locally controlled, either autonomously or semi-autonomously with user input. Multi-well reaction vessels 119 can be transferred between the system elements by hand or by an automated robotic system 110, e.g., under the control over the controller 101. The automated robotic system 110 can include any suitable assembly of actuators for effecting sample transfer between the system elements, but according to one embodiment, includes at least a rotary actuator 111 that rotates a robotic arm 113 between different system elements, with an end 115 having a manipulator 117 thereon that can grasp the multi-well reaction vessels 119 and manipulate their orientation in space to insert or remove the multi-well reaction vessels into or from the various system elements.

The acoustic sample handler 120 can transfer samples acoustically between multi-well reaction vessels, individual sample vessels, or the like. The acoustic sample handler 120 can include an onboard processor 121 and memory device 123 that control acoustic interrogation and/or ejection, an acoustic ejector 125, and any suitable number of actuators 127 for retaining and moving one or more of the acoustic ejector, a source vessel 129, and a receiving vessel 131, which can be multi-well reaction vessels 119 or can be other vessels. For example, according to some embodiments, a singular source vessel can be used to populate a multi-well reaction vessel, or a first multi-well reaction vessel can populate a second multi-well reaction vessel by acoustic ejection from wells in one to wells in the other via the acoustic ejector 125. According to some embodiments, the acoustic ejector 125 can be used to acoustically interrogate wells in the source vessel 129, e.g., by emitting acoustic energy into the source vessel, detecting echoes of the emitted acoustic energy, and determining parameters of the interrogated wells from the echo. Such parameters can include, but are not limited to, meniscus height, viscosity, acoustic impedance, and the like.

The thermal cycler 140 can receive a multi-well reaction vessel 119 within a heating chamber 151, and perform thermal cycles on samples within the reaction vessel under the control of a local processor 141 and memory device 143 that can contain program instructions for a thermal process under the control of the processor. The thermal cycler includes an insulated body 145 and a closure 147 connected at a hinge 149 that together define the heating chamber 151. The heating chamber 151 contains a heating element 153, e.g. a resistive heating filament or the like that is generally enclosed in a thermally conductive heating element block 155 that protects the heating element. The heating element 153 and heating element block 155 are referred to throughout collectively as the heating element.

A compliant thermally conductive insert 157 can be placed within the heating chamber 151 on the heating element 153, in thermal contact with the heating element (or heating element block 155), and in position to directly contact the multi-well reaction vessel 119 when the vessel is inserted into the heating chamber 151. The heating chamber 151 is sized so that, when the multi-well reaction vessel 119 is inserted therein, and the lid 159 is secured, the closer causes the multi-well reaction vessel to compress the compliant thermally conductive insert 157 so that the insert deforms to adopt a compressed profile that increases the thermal contact area of the compliant thermally conductive insert with both the heating element 153 and the multi-well reaction vessel.

The compliant thermally conductive insert 157 is reversibly deformable under pressure, such that it can adopt a variety of different compressed profiles in response to compression between multi-well reaction vessels 119 having different specific topographies, or between heating elements in different thermal cyclers having different specific topographies. According to some embodiments, the compliant thermally conductive insert includes any suitable number of graphite layers arranged in a compressible form. Graphitic thermally conductive inserts can be constructed of, for example, a creped graphite layer or assembly of multiple creped graphite layers. Suitable creped graphite layers can be formed by finely deforming a planar graphitic sheet to introduce numerous micro-folds that adopt an accordion-like microstructure having a sheet thickness on the order of 10-2000 microns, or larger. According to various other embodiments, the compliant thermally conductive insert can be a thermally conductive, compliant, elastic polymer or polymer composite.

One suitable creped graphite material has been produced by NeoGraf Solutions, LLC, OH, USA, and is described in PCT Patent Publication No. WO 2019/142082 A2, entitled "A GRAPHITE ARTICLE AND METHOD OF MAKING SAME," which is hereby incorporated by reference for all purposes. Specific products have thermal conductivity in-plane in excess of 400 W/m-K, which exceeds that of aluminum (which is under 250 W/m-K), yet exhibit compliance for a thickness range of over 250 microns at 100 kPa for a 500-micron sheet. In comparison, thermal cyclers can generate pressures on microplates during cycling to maintain seal integrity of at least a significant fraction of 100 kPa. Notably, elastically deformable graphite has never been adapted for use in a thermal cycler, having instead been hypothesized as a solution for permanent installation in electronics, e.g., clamped permanently between a processor and heat sink.

According to various embodiments, the compliant thermally conductive insert can have an uncompressed thickness in a range from 250 microns to 2000 microns, or from 250 microns to 1000 microns, or from 250 microns to 750 microns. The compliant thermally conductive insert may have an in-plane thermal conductivity of at least 200 W/m-K, preferably at least 700 W/m-K, or larger. The compliant thermally conductive insert may have a through-plane thermal conductivity that increases nonlinearly with compressive stress when placed between the heating element and a multi-well reaction vessel. The through-plane thermal conductivity may range from 1-5 W/m-K at 100 kPa compressive stress to 10-30 W/m-K at 700 kPa compressive stress or may be higher. Alternatively, the through-plane thermal conductivity of the compliant thermally conductive insert may be sufficient to allow sufficient heat flux to samples in a flat-bottomed acoustically enabled plate from a heating element to cause sample heating of at least 0.5° C., or 1° C./s, preferably at least 1.5° C./s, and more preferably at least 2° C./s. The compliant thermally conductive insert may also be reversibly deformable. For example, when subjected to compressive stress of 700 kPa, the compliant thermally conductive insert may reversibly compresses to less than 60% of an original (unloaded) thickness, and can revert to at least 70% of the original thickness, preferably at least 80% of the original thickness, more preferably at least 90% of the original thickness. When repeatedly compressed, the compliant thermally conductive insert may revert to the same uncompressed thickness after subsequent compressions. According to some embodiments, compliant thermally conductive insert(s) may be configured for placement on top of the multi-well reaction vessel as well, to facilitate flexure of the multi-well reaction vessel within the heating chamber and/or to provide improved lateral heat conduction across the reaction vessel by the compliant thermally conductive inserts.

The analyzer assembly 160 can receive a multi-well reaction vessel 119 in order to effect automated sample analysis via acoustic ejection under the control of a local processor 161 and memory device 163 that can contain program instructions for controlling the analyzer 169, in accordance with various embodiments of the present disclosure. Various specific automated analyzers may be indicated for use with the described automation system 100. For example, according to some embodiments, the analyzer 169 can be DNA scanner, a flow cytometer, a gas chromatograph and/or mass spectrometer, a high-pressure liquid chromatograph, or other suitable analyzer that receives and processes a liquid sample. The multi-well reaction vessel 119 can be inserted in the analyzer assembly 160 at a sample handling stage 167. Individual samples from the multi-well reaction vessel 119 can be ejected from the vessel into an inlet port 171 of the analyzer 169 via an acoustic ejector 165. The sample handling stage 167 can include any suitable actuators for moving the multi-well reaction vessel 119 relative to the inlet port 171, for moving the acoustic ejector 165 to effect ejection, or both. According to some embodiments, the acoustic ejector 165 can also function as an emitter for conducting acoustic interrogation of sample wells in the multi-well reaction vessel 119, e.g., to assess depth and/or acoustic impedance prior to an ejection, or other suitable interrogation.

In combination, the system 100 can provide for partially or fully automated sample handling and transfer, e.g., by a robotics system 110, between source vessels and multi-well reaction vessels 119 via an acoustic sample handler 120, to and from a thermal cycler 140, and to an analyzer assembly 160, in accordance with various embodiments. The thermal cycler 140, via the compliant thermally conductive insert 157, has the technical advantage of being capable of handling acoustically compatible microplates that are generally stiff and flat-bottomed by enhancing the thermal contact between an inserted multi-well reaction vessel 119 and the heating element 153. The use of reversibly deformable and inert materials in the compliant thermally conductive insert also prevents deposition of residue on the bottom surface of the multi-well reaction vessel, allowing it to remain sufficiently clean throughout an automated sample handling procedure for repeated acoustic sample transfers. This approach contrasts with conventional approaches, in which specialized plate geometries are employed to enhance dry thermal transfer between heating elements and reaction vessels, or in which partial immersion in a working fluid may be used to enhance thermal transfer.

Figure 2:
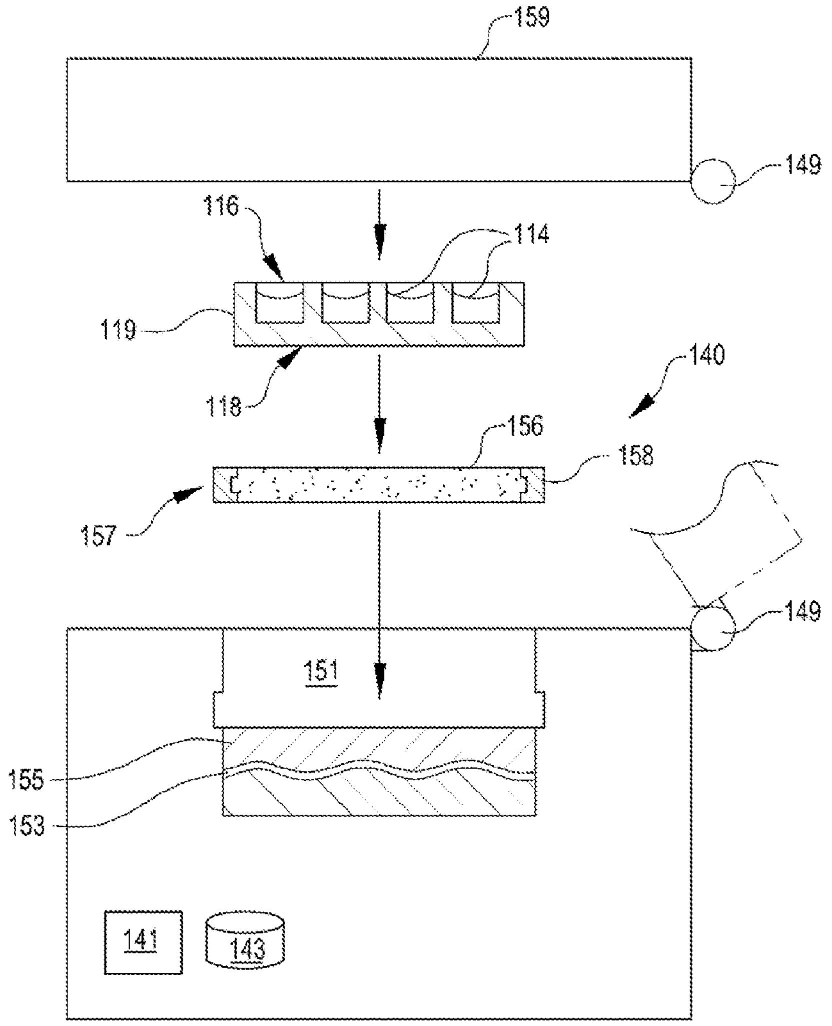
FIG. 2 is a simplified side section schematic illustrating a thermal cycler assembly, compatible with the system of FIG. 1, for receiving multi-well reaction vessels and incorporating a compliant thermally conductive insert.

FIG. 2 is a simplified side section schematic illustrating the thermal cycler 140, compatible with the system 100 of FIG. 1, for receiving multi-well reaction vessels 119 and incorporating a compliant thermally conductive insert 157 in more detail. The compliant thermally conductive insert 157 can be layered between the heating element block 155, containing the heating element 153, and the multi-well reaction vessel 119. Closure of the lid 159 compresses the compliant thermally conductive insert 157 between the bottom surface 118 of the multi-well reaction vessel 119 and the heating element 153. The compression causes the compliant thermally conductive insert 157 to deform in order to increase the contact area of the insert along the bottom surface 118 of the multi-well reaction vessel 119, preventing the formation of air pockets under any particular well 116, and promoting even application of heat to the samples 114 contained therein. The compliant thermally conductive insert has enough compliance to maintain physical contact at least between a conventional "flat" PCR heat transfer block and the surface below the wells of a "flat-bottom" microplate. Depending on the thickness of the compliant thermally conductive insert, the number of sheets used and the pressure applied, the non-flatness between the heating element block 155 and the bottom surface 118 of the multi-well reaction vessel plate that can be filled by the insert can be characterized by "gaps" of 100, 200 or even 500 microns (i.e., a topographical difference between adjacent high and low points of up to 100, up to 200, or up to 500 microns).

According to various embodiments, the compliant thermally conductive insert 157 can include a creped graphitic material 156 supported in a frame 158 sized and shaped to align the insert within the heating chamber 151, to align the bottom surface of the multi-well reaction vessel 119 and the heating element 153, or both. According to some embodiments, the frame 158 can be compatible with the manipulator 117 of the robotic system 110 (FIG. 1), so that it can be automatically placed into or removed from the heating chamber 151.

Figure 3:
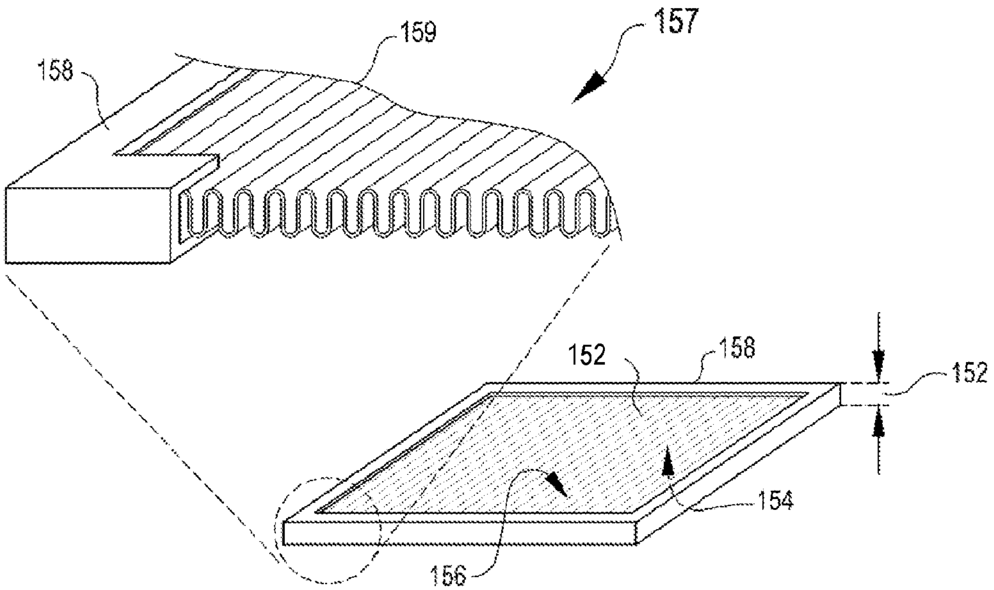
FIG. 3 is a detailed perspective view illustrating aspects of the compliant thermally conductive insert of FIG. 2.

FIG. 3 is a detailed perspective view illustrating aspects of the compliant thermally conductive insert 157 of FIG. 2, in additional detail. The frame 158 encloses and supports at least one layer of creped graphitic material 156, optionally multiple layers of the creped graphitic material. The layer(s) of creped graphitic material can have a thickness ranging from as low as 10 microns up to 2000 microns between a top surface 152 and a bottom surface 154. One or both of the bottom surface 154 and top surface 152 can include an additional layer of a flexible and thermally conductive, but not significantly compliant, support material to provide either a protective outer surface or a surface for bonding to the sheets of the creped graphitic material (or other suitable compliant and high-thermal conductivity material). The frame could include single or multiple sheets at one or more of the heat block facing surface, the plate facing surface or the interior of the apparatus. An insert frame thickness 152 can be varied as well, e.g., from 10 microns to 2000 microns, matching an approximate thickness of the creped graphitic material 156, or can be significantly thicker in order to provide gripping surfaces for automated handling. The frame 158 can be characterized as an interface apparatus for moving the compliant thermally conductive insert into and out of the thermal cycler, and may be designed to facilitate the movement of the frame by an automation system such as those made for moving SLAS/ANSI standard microplates. The frame 158 can also be shaped to removably or permanently connect to a multi-well reaction vessel 119, or suitable microplate, and for both the plate and frame to be movable as a combined assembly.

The compliant thermally conductive insert 157 can deform to accommodate a variety of imperfections or non-flat topographies in the multi-well reaction vessels 119 or in the heating element block 155 of a thermal cycler. Several such use cases are described below with reference to FIGS. 4A-4E, which illustrate various deformation profiles of a compliant thermally conductive insert as shown in FIG. 2 and FIG. 3.

Figure 4A:
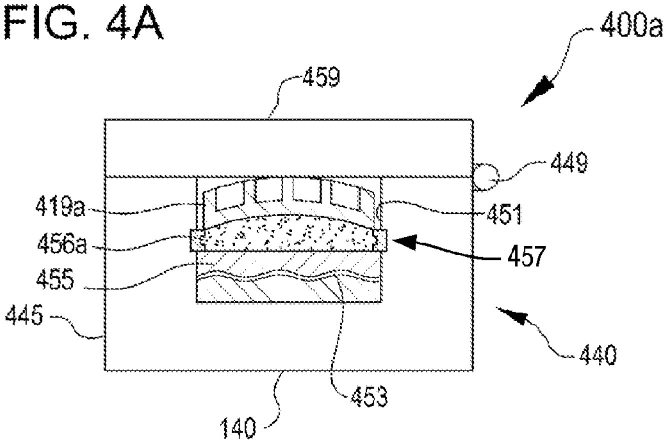
FIG. 4A-4E are simplified side-section schematics illustrating various deformation profiles of a compliant thermally conductive insert as shown in FIG. 2 and FIG. 3.

For example, FIG. 4A illustrates a first use case 400*a*, in which a multi-well reaction vessel 419*a* is enclosed and compressed within the heating cavity 451 of a thermal cycler 440. Like the thermal cycler 140 illustrated above, thermal cycler 440 includes an insulated body 445 having a lid 459 attached at a hinge 449 that can be lowered to exert pressure on the multi-well reaction vessel 419*a* when the vessel is inserted in the heating cavity 451. A compliant thermally conductive insert 457 is positioned sandwiched between the multi-well reaction vessel 419*a* and the heating block 455 and associated heating element 453. In first use case 400*a*, the multi-well reaction vessel 419*a* adopts a convex, bowed configuration in response to the thermal cycling. If subjected to a conventional approach, the clamping force by the lid 459 is insufficient to flatten the multi-well reaction vessel 419*a* into contact with the heating block 455 sufficient to maintain efficient heat transfer. However, the compliant thermally conductive material 456*a* in the compliant thermally conductive insert 457 can reversibly deform in order to contact all, or substantially all, of the bottom surface of the multi-well reaction vessel 419*a* while maintaining contact with the heating block 455 and, by extension, the heating element 453. According to some embodiments, an additional compliant thermally conductive insert can be placed on top of the multi-well reaction vessel in order to accommodate flexure of the reaction vessel while maximizing lateral heat conduction.

Figure 4B:
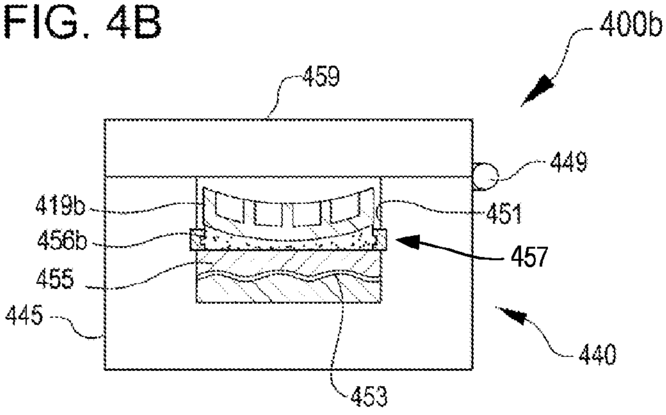

Similarly, FIG. 4B illustrates a second use case 400*b*, in which a multi-well reaction vessel 419*b* is enclosed and compressed within the heating cavity 451 of a thermal cycler 440. In second use case 400*b*, the multi-well reaction vessel 419*b* adopts a concave configuration in response to the thermal cycling. If subjected to a conventional approach, the clamping force by the lid 459 is insufficient to flatten the multi-well reaction vessel 419*b* into contact with the heating block 455 sufficient to maintain efficient heat transfer. However, the compliant thermally conductive material 456*b* in the compliant thermally conductive insert 457 can reversibly deform in order to contact all, or substantially all, of the bottom surface of the multi-well reaction vessel 419*b* while maintaining contact with the heating block 455 and, by extension, the heating element 453.

Figure 4C:
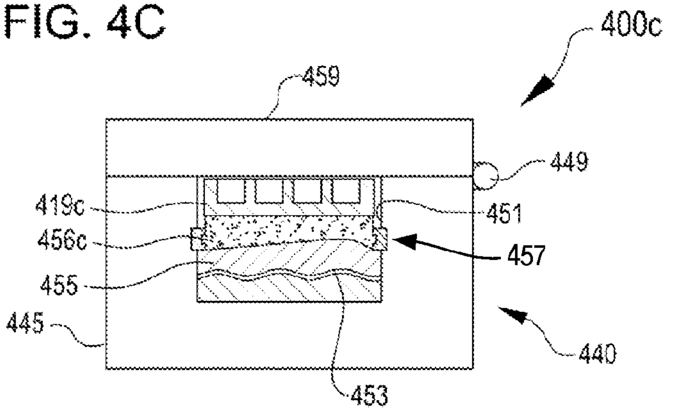

FIG. 4C illustrates a third use case 400*c*, in which the compliant thermally conductive insert 457 accommodates deformation or misalignment of the heating block 455. For example, in third use case 400*c*, the flat bottom surface of the multi-well reaction vessel 419*c* is no longer parallel to the top surface of the heating block 455. The compliant thermally conductive material 456*c* in the compliant thermally conductive insert 457 can reversibly deform in a wedge-like shape in order to contact all, or substantially all, of the bottom surface of the multi-well reaction vessel 419*c* while maintaining contact with the heating block 455 and, by extension, the heating element 453.

Figure 4D:
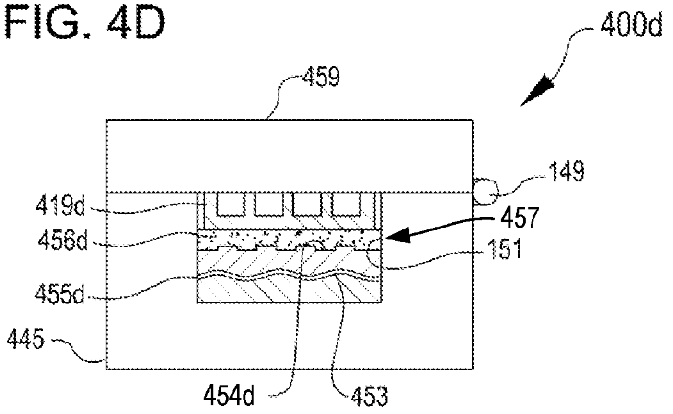

FIG. 4D illustrates a fourth use case 400*d*, in which a multi-well reaction vessel 419*d* is enclosed and compressed within the heating cavity 451 of a thermal cycler 440 above a heating block 455*d* with surface features 454*d* which can represent, for example, surface damage or imperfections, or an otherwise raised topography. A compliant thermally conductive insert 457 is positioned sandwiched between the multi-well reaction vessel 419*d* and the heating block 455*d* and associated heating element 453. The compliant thermally conductive material 456*d* in the compliant thermally conductive insert 457 can reversibly deform to fill space around the surface features 454*d* in order to minimize air pockets and to contact all, or substantially all, of the bottom surface of the multi-well reaction vessel 419*d* while maintaining contact with the heating block 455*d* and, by extension, the heating element 453.

Figure 4E:
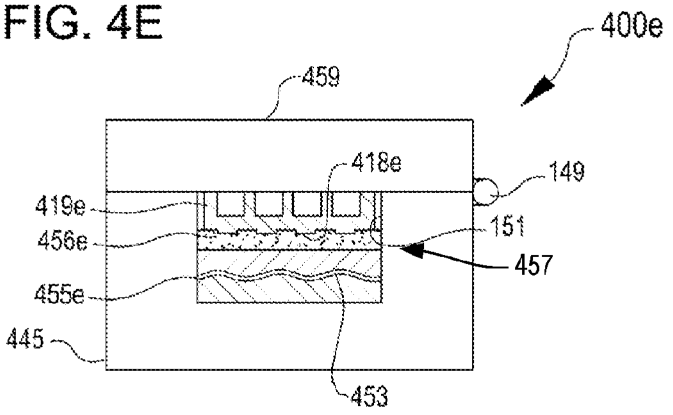

FIG. 4E illustrates a fifth use case 400*e*, in which a multi-well reaction vessel 419*e* that is enclosed and compressed within the heating cavity 451 of a thermal cycler 440 has surface features 418*e* on a bottom surface thereof that reflect, for example, surface damage or imperfections, or an otherwise raised topography. A compliant thermally conductive insert 457 is positioned sandwiched between the multi-well reaction vessel 419*e* and the heating block 455*e* and associated heating element 453. The compliant thermally conductive material 456*e* in the compliant thermally conductive insert 457 can reversibly deform to fill space around the surface features 418*e* in order to minimize air pockets and to contact all, or substantially all, of the bottom surface of the multi-well reaction vessel 419*e* while maintaining contact with the heating block 455*e* and, by extension, the heating element 453.

Figure 5:
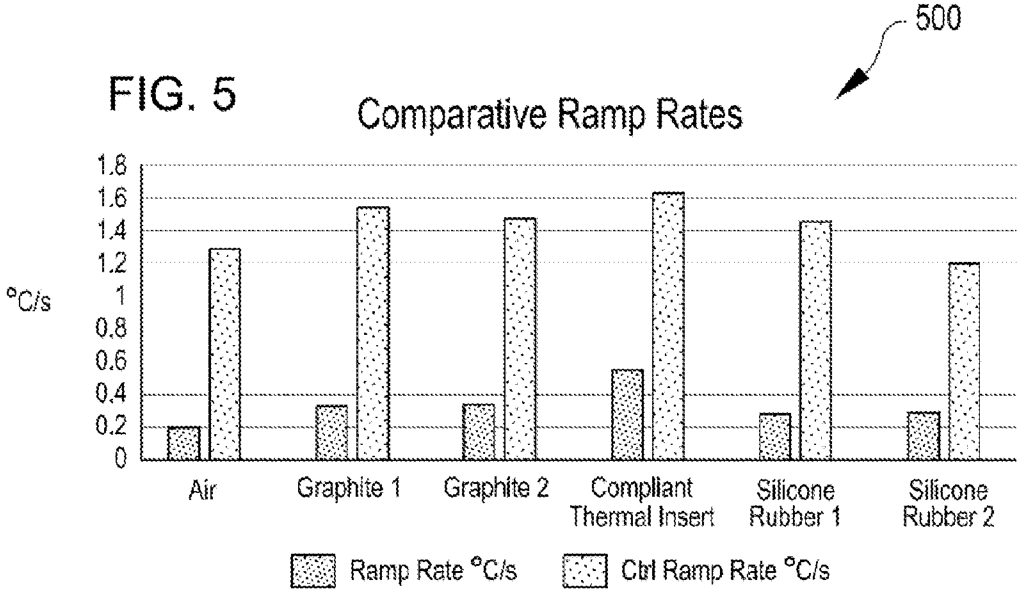
FIG. 5 is a graphical representation illustrating comparative ramp rates of sample-containing multi-well reaction vessels in a thermal cycler with a compliant thermally conductive insert and with alternative materials.

Data on effective ramp rates for several interstitial material options were collected to determine whether the compliant thermally conductive inserts improved over conventional materials, and are shown in FIG. 5. FIG. 5 is a graphical representation illustrating comparative ramp rates 500 of sample-containing multi-well reaction vessels in a thermal cycler with a compliant thermally conductive insert and with alternative materials.

The comparative ramp rates 500 illustrated in FIG. 5 were obtained by measuring temperature over time in several cells of a 384-well, flat bottomed acoustic microplate containing aqueous solution, each well containing 10 microliters of fluid. Note that these plates have thicker bottoms (980 microns nominal) than typical PCR plates (roughly 600 microns in thickness for the control) and lower surface area for heat transfer to the flat bottom versus the conventional conical shape. Therefore, lower ramp rates for the acoustic microplate data were expected compared to the control PCR plate data.

To obtain the temperature ramp data, thermocouples were inserted into the fluid samples in wells E7, L7, E18 and L18 of the 384-well plates. An additional thermocouple was used to monitor the heat transfer block temperature. This additional thermocouple was placed between two layers of aluminum foil and located directly on top of the heating block and pressed firmly against the bottom of the thermal adapter media. Different thermal adapter media were tested for their performance in well temperature ramp rate during thermal cycling as reflected in FIG. 5 and shown in Table 1, below.

TABLE 1

Comparative Ramp Rates for Interstitial Materials

| Interstitial Material | Ramp Rate ° C./sec (Acoustic Plate) | Ctrl Ramp Rate (PCR Plate) |
|---|---|---|
| Nothing/Air | 0.20 | 1.31 |
| Graphite 1 | 0.35 | 1.54 |
| Graphite 2 | 0.37 | 1.49 |
| Creped Graphite | 0.58 | 1.63 |
| Silicone Rubber 1 | 0.29 | 1.47 |
| Silicone Rubber 2 | 0.31 | 1.21 |

As illustrated in Table 1 above, and in FIG. 5, the ramp rates achieved between planar heating element blocks and a flat-bottomed, acoustically enabled plate were much lower than the control ramp rates achieved using PCR plates. However, the averaged ramp rate using the creped graphite material, i.e., a reversibly compressible thermally conductive material, was significantly higher for the flat-bottomed plates than any other material selected. Graphite sheets (Graphite 1, Graphite 2) were more thermally conductive, but were not compliant; while Silicone Rubber (Silicone Rubber 1, Silicone Rubber 2) were highly compliant, but less thermally conductive. As shown, the combination of reversible deformation (compliance) and thermal conductivity provided significant improvements in ramp rate.

Examples of automated and semi-automated processes for sample handling and thermal cycling, e.g., for use in conjunction with automated PCR, are described below with reference to FIGS. 6-8. The processes 600, 700, and 800 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of processes 600, 700, and 800 may be performed manually. Specific process steps are described in each process, but unless specifically contraindicated, each process step of processes 600, 700, and 800 may be performed in any suitable order, or may be performed in series with steps of a different process. For example, steps of process 700 or process 800 may follow after steps of process 600, or vice-versa.

Figure 6:
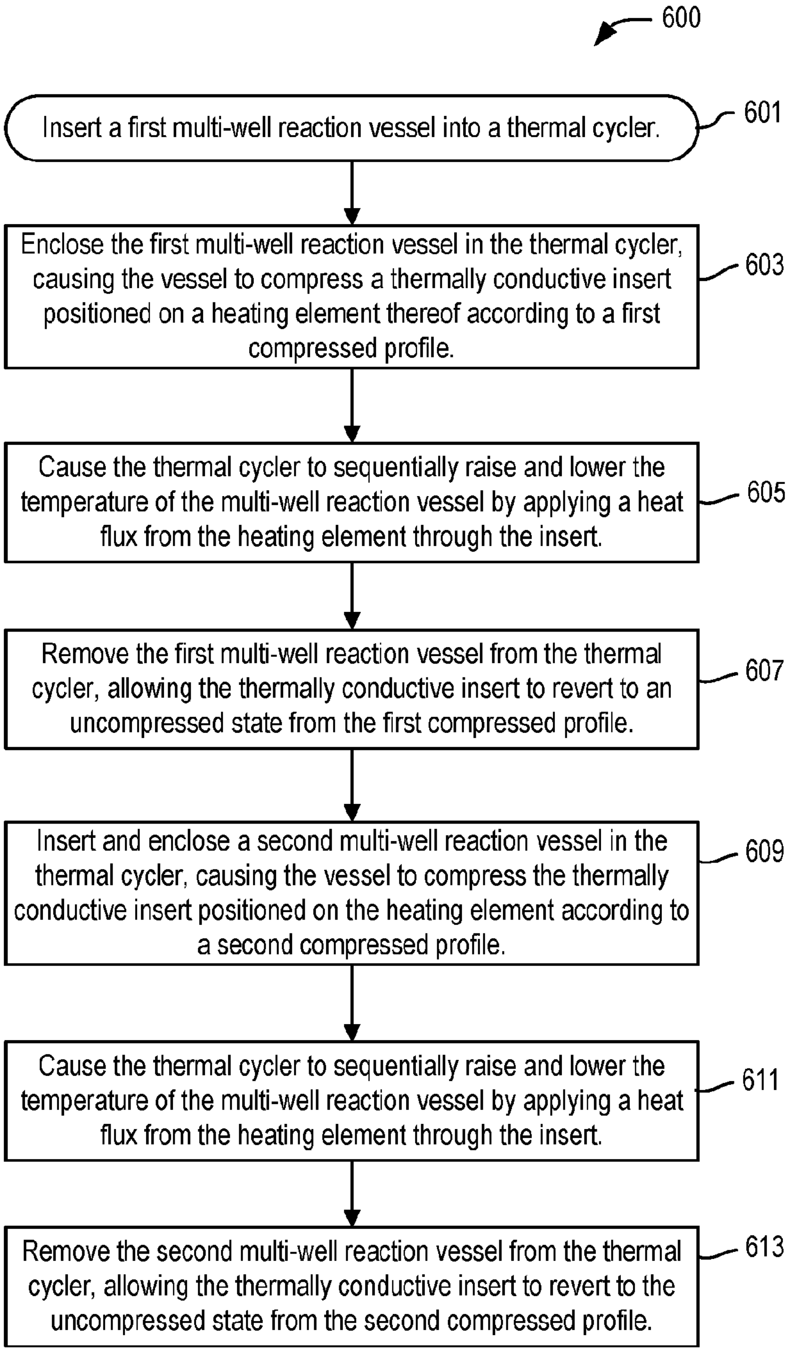
FIG. 6 is a process flow diagram illustrating a first example of a process for sample handling and thermal cycling of samples contained in a multi-well reaction vessel using a compliant, thermally conductive insert.

FIG. 6 is a process flow diagram illustrating a first example of a process 600 for sample handling and thermal cycling of samples contained in a multi-well reaction vessel using a compliant, thermally conductive insert. In process 600, a first multi-well reaction vessel is inserted into a thermal cycler, at 601. The first multi-well reaction vessel can then be enclosed in the thermal cycler, causing the vessel to compress a thermally conductive insert positioned on a heating element thereof according to a first compressed profile, at 603. The thermal cycler can then by cycled according to a predefined temperature program to sequentially raise and lower the temperature of the multi-well reaction vessel by applying a heat flux from the heating element through the insert, at 605. Once complete, the first multi-well reaction vessel can be removed from the thermal cycler, allowing the thermally conductive insert to revert to an uncompressed state from the first compressed profile, at 607.

Subsequently, a second multi-well reaction vessel can be inserted in the thermal cycler, causing the vessel to compress the thermally conductive insert positioned on the heating element according to a second compressed profile, at 609, where the second compressed profile differs in geometry from the first compressed profile. For example, the profiles may reflect different surface topographies of the bottom surface of the multi-well reaction vessels in each operation. The thermal cycler can be cycled to sequentially raise and lower the temperature of the multi-well reaction vessel by applying a heat flux from the heating element through the insert, at 611, and then the second multi-well reaction vessel can be removed from the thermal cycler, allowing the thermally conductive insert to revert to the uncompressed state from the second compressed profile, at 613. Importantly, the first and second compressed profiles, though different, do not materially alter the uncompressed state of the compliant thermally conductive insert. Furthermore, the compliant thermally conductive insert compresses in both operations to provide uniform heat flux across the gap between the heating element and the multi-well reaction vessels.

Figure 7:
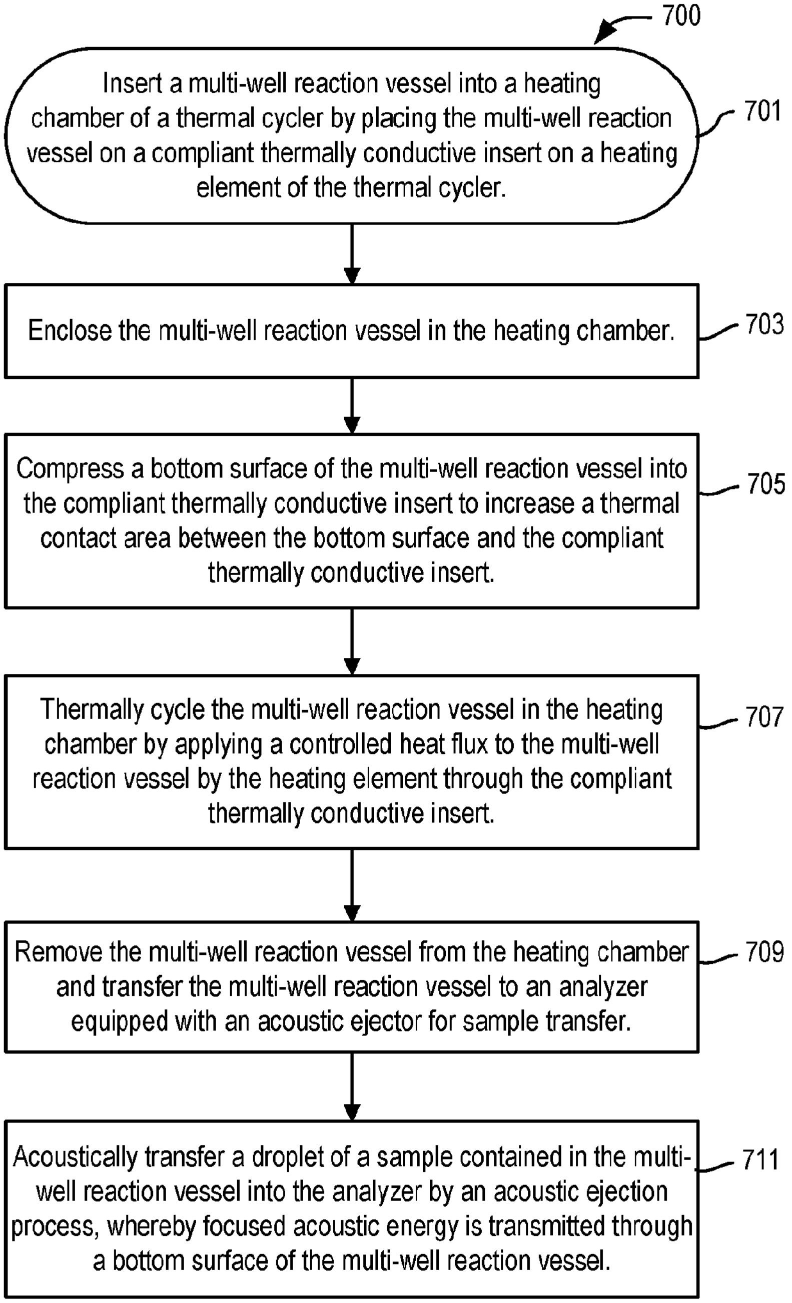
FIG. 7 is a process flow diagram illustrating a second example of a process for sample handling and thermal cycling of samples contained in a multi-well reaction vessel using a compliant, thermally conductive insert.

FIG. 7 is a process flow diagram illustrating a second example of a process for sample handling and thermal cycling of samples contained in a multi-well reaction vessel using a compliant, thermally conductive insert. In process 700, either a user or an automatic robotic manipulator may insert a multi-well reaction vessel into a heating chamber of a thermal cycler by placing the multi-well reaction vessel on a compliant thermally conductive insert on a heating element of the thermal cycler, at 701. The multi-well reaction vessel can then be enclosed in the heating chamber, at 703. Securing the thermal cycler cover can include compressing a bottom surface of the multi-well reaction vessel into the compliant thermally conductive insert to increase a thermal contact area between the bottom surface and the compliant thermally conductive insert, at 705.

Once the multi-well reaction vessel is enclosed in the heating chamber, the thermal cycler can be thermally cycled according to a thermal program by applying a controlled heat flux to the multi-well reaction vessel by the heating element through the compliant thermally conductive insert, at 707. According to some embodiments, the thermal cycler can repeatedly increase and decrease in temperature. Some thermal cyclers may simply allow heat to dissipate to cool the multi-well reaction vessels between heating cycles, whereas other thermal cyclers may include cooling mechanisms (e.g., a cold working fluid, refrigeration, or the like). Once the thermal program is complete, the multi-well reaction vessel can be removed from the heating chamber.

According to some embodiments, the multi-well reaction vessel can be transferred to an analyzer equipped with an acoustic ejector for sample transfer, at 709, after completion of a thermal program. The acoustic ejector can be configured to acoustically transfer a droplet of a sample contained in the multi-well reaction vessel into the analyzer by an acoustic ejection process, whereby focused acoustic energy is transmitted through a bottom surface of the multi-well reaction vessel, at 711, in order to transfer a droplet of the sample into an inlet of an analyzer.

Figure 8:
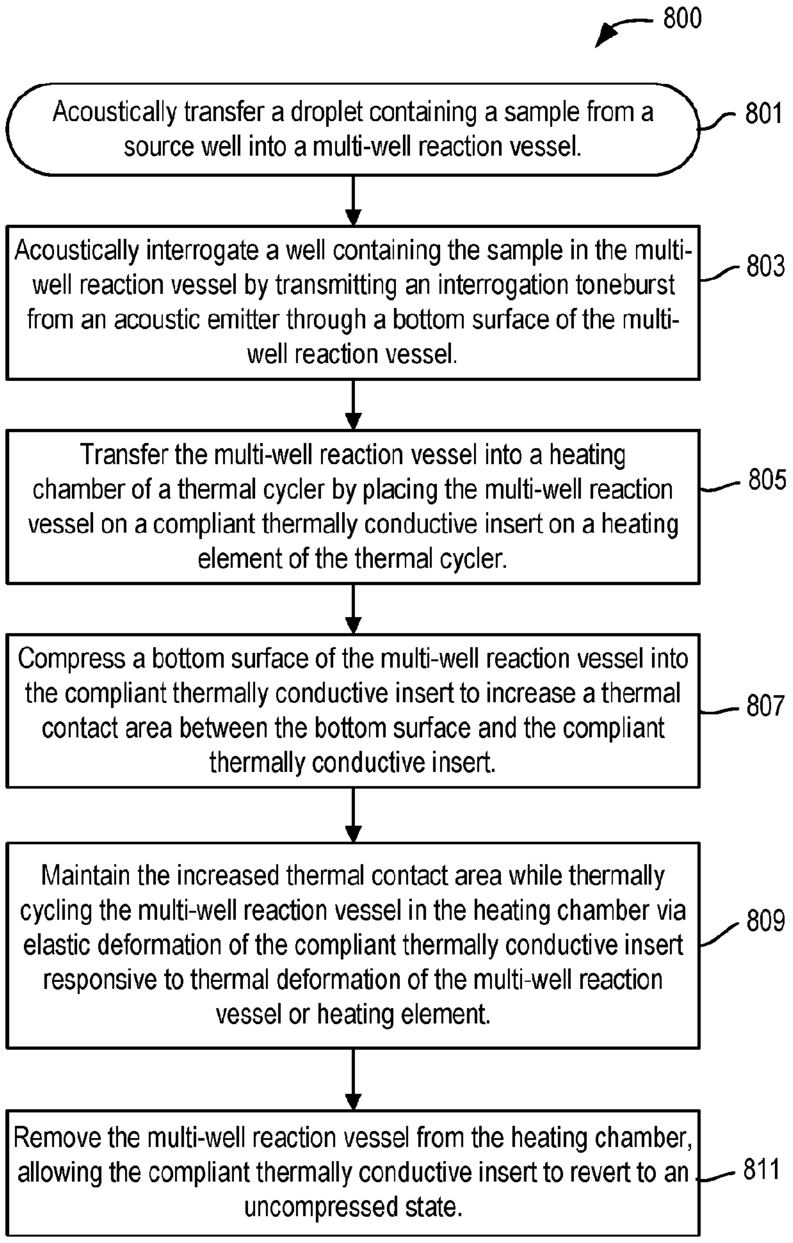
FIG. 8 is a process flow diagram illustrating a third example of a process for sample handling and thermal cycling of samples contained in a multi-well reaction vessel using a compliant, thermally conductive insert.

FIG. 8 is a process flow diagram illustrating a third example of a process for sample handling and thermal cycling of samples contained in a multi-well reaction vessel using a compliant, thermally conductive insert. In the process 800, a droplet containing a sample from a source well can be transferred acoustically into a multi-well reaction vessel, at 801, e.g. via an acoustic sample handling assembly. The system can also acoustically interrogate sample-containing wells in the multi-well reaction vessel by transmitting an interrogation toneburst from an acoustic emitter through a bottom surface of the multi-well reaction vessel, at 803. Sample interrogation can be used to determine various sample attributes, e.g., sample depth, acoustic impedance, viscosity, and other attributes. The multi-well reaction vessel can be inserted, manually or automatically, into a heating chamber of a thermal cycler by placing the multi-well reaction vessel on a compliant thermally conductive insert on a heating element of the thermal cycler, at 805. Enclosing the multi-well reaction vessel in the thermal cycler, compresses a bottom surface of the multi-well reaction vessel into the compliant thermally conductive insert to increase a thermal contact area between the bottom surface and the compliant thermally conductive insert, at 807. The increase in contact area is relative to, for example, a hypothetical contact area that might be achieved between the bottom surface of the multi-well reaction vessel and a flat thermal plate, or a non-compliant thermally conductive insert, in which voids or air pockets would tend to form between the adjacent surfaces. This increased contact area is maintained while thermally cycling the multi-well reaction vessel in the heating chamber via elastic deformation of the compliant thermally conductive insert responsive to thermal deformation of the multi-well reaction vessel or heating element, at 809. For example, if the multi-well reaction vessel bows either upward or downward due to heating or cooling, the compliant thermally conductive insert can elastically deform to follow the bottom surface thereof for as long as it is compressed, without permanently flowing or plastically deforming. Removal of the multi-well reaction vessel from the heating chamber allows the compliant thermally conductive insert to revert to an uncompressed state, at 811.

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

In the following, further examples are described to facilitate the understanding of the invention:

Example A. A system, comprising:

a robotic sample handler configured to retain and move a multi-well reaction vessel;

a thermal cycler comprising a heating chamber shaped for receiving the multi-well reaction vessel containing a heating element, a compliant thermally conductive insert comprising an elastically deformable creped graphite sheet positioned adjacent the heating element, and a closing mechanism configured to press the multi-well reaction vessel toward the compliant thermally conductive insert and the heating element; and a controller operably connected with the robotic sample handler and thermal cycler, the controller comprising at least one processor and memory containing executable instructions that, when executed by the at least one processor, configure the controller to:

cause the robotic sample handler to insert the multi-well reaction vessel into the thermal cycler;

cause the closing mechanism to enclose the multi-well reaction vessel in the heating chamber;

compress a bottom surface of the multi-well reaction vessel into the compliant thermally conductive insert by the closing mechanism; and thermally cycle the multi-well reaction vessel in the heating chamber by the heating element by applying a controlled heat flux to the multi-well reaction vessel from the heating element through the compliant thermally conductive insert.

Example B. The system of the preceding example, wherein:

compressing the bottom surface of the multi-well reaction vessel into the compliant thermally conductive insert causes reversible deformation of the creped graphite sheet according to a first compression profile;

compressing a second bottom surface of a second multi-well reaction vessel into the compliant thermally conductive insert causes reversible deformation of the creped graphite sheet according to a second compression profile that is different from the first compression profile; and the compliant thermally conductive insert reverts to an uncompressed state from the first compressed profile and from the second compressed profile without permanently deforming.

Example C. The system of any one of the preceding examples, further comprising:

a source vessel containing a reagent or sample; and an acoustic ejector comprising a transducer configured to emit focused acoustic radiation and an actuator configured to align the acoustic ejector and source vessel with wells of the multi-well reaction vessel, wherein the executable instructions, when executed by the at least one processor, further configure the controller to:

cause the actuator to selectively align the transducer and source vessel with one or more of the wells of the multi-well reaction vessel; and cause the acoustic ejector to eject one or more droplets from the source vessel to the wells of the multi-well reaction vessel by applying the focused acoustic radiation to samples contained in the source vessel.

Example D. The system of any one of the preceding examples, further comprising:

a multi-well receiving vessel; and an acoustic ejector comprising a transducer configured to emit focused acoustic radiation and an actuator configured to align the acoustic ejector and the multi-well reaction vessel with wells of the multi-well receiving vessel, wherein the executable instructions, when executed by the at least one processor, further configure the controller to:

cause the actuator to selectively align the transducer and multi-well reaction vessel with one or more of the wells of the multi-well receiving vessel; and cause the acoustic ejector to eject one or more droplets from the multi-well reaction vessel to the wells of the multi-well receiving vessel by applying the focused acoustic radiation to samples contained in the multi-well reaction vessel.

Example E. The system of any one of the preceding examples, further comprising:

an analyzer comprising a sample inlet; and an acoustic ejector comprising a transducer configured to emit focused acoustic radiation and an actuator configured to align the acoustic ejector and the multi-well reaction vessel with the sample inlet of the analyzer, wherein the executable instructions, when executed by the at least one processor, further configure the controller to:

cause the actuator to selectively align the transducer and multi-well reaction vessel with the sample inlet of the analyzer; and cause the acoustic ejector to eject one or more droplets from the multi-well reaction vessel to the sample inlet by applying the focused acoustic radiation to a sample contained in the multi-well reaction vessel.

Example F. A method, comprising:

inserting a multi-well reaction vessel into a heating chamber of a thermal cycler by placing the multi-well reaction vessel on a compliant thermally conductive insert on a heating element of the thermal cycler, the compliant thermally conductive insert comprising an elastically deformable creped graphite sheet;

enclosing the multi-well reaction vessel in the heating chamber; and compressing a bottom surface of the multi-well reaction vessel into the compliant thermally conductive insert to increase a thermal contact area between the bottom surface and the compliant thermally conductive insert; and thermally cycling the multi-well reaction vessel in the heating chamber by applying a controlled heat flux to the multi-well reaction vessel by the heating element through the compliant thermally conductive insert.

Example G. The method of the preceding example, wherein the compliant thermally conductive insert has an uncompressed thickness in a range from 250 microns to 2000 microns.

Example H. The method of any one of the preceding examples, wherein the compliant thermally conductive insert has an in-plane thermal conductivity of at least 200 W/m-K, preferably at least 700 W/m-K.

Example I. The method of any one of the preceding examples, wherein the compliant thermally conductive insert has a through-plane thermal conductivity that increases nonlinearly with compressive stress, the through-plane thermal conductivity ranging from 1-5 W/m-K at 100 kPa compressive stress to 10-30 W/m-K at 700 kPa compressive stress.

Example J. The method of any one of the preceding examples, wherein the compliant thermally conductive insert, when subjected to compressive stress of 700 kPa, reversibly compresses to less than 60% of an original thickness.

Example K. The method of any one of the preceding examples, wherein the multi-well reaction vessel comprises a microplate comprising an array of wells having at least one flat bottom surface configured to permit acoustic auditing of a sample contained in the array of wells through the flat bottom surface, the method further comprising:

emitting an interrogation toneburst from an acoustic emitter through the flat bottom surface;

detecting an acoustic echo caused by the interrogation toneburst; and determining a parameter of the sample from the detected acoustic echo.

Example L. The method of any one of the preceding examples, wherein thermally cycling the multi-well reaction vessel in the heating chamber comprises sequentially heating and cooling samples contained in the multi-well reaction vessel according to a PCR thermal cycle program at a heating or cooling rate of at least 1° C./s, preferably at least 1.5° C./s, preferably at least 2° C./s.

Example M. The method of any one of the preceding examples, further comprising:

aligning one or more wells of the multi-well reaction vessel with a source well and an acoustic ejector positioned to acoustically eject fluid droplets from the source well; and ejecting one or more droplets from the source well to the wells of the multi-well reaction vessel by applying focused acoustic radiation from the acoustic ejector to a sample contained in the source well.

Example N. The method of any one of the preceding examples, further comprising:

aligning one or more wells of the multi-well reaction vessel with an acoustic ejector positioned to acoustically eject fluid droplets from the multi-well reaction vessel and with a multi-well receiving vessel; and ejecting one or more droplets from wells of the multi-well reaction vessel to wells of the multi-well receiving vessel by applying focused acoustic radiation from the acoustic ejector to samples contained in the wells of the multi-well reaction vessel.

Example O. The method of any one of the preceding examples, further comprising:

aligning a well of the multi-well reaction vessel with an acoustic ejector positioned to acoustically eject fluid droplets from the multi-well reaction vessel and with a sample inlet of an analytical device; and ejecting one or more droplets from the well of the multi-well reaction vessel to the sample inlet by applying focused acoustic radiation from the acoustic ejector to a sample contained in the well.

Example P. A thermal cycler assembly, comprising:

a heating chamber;

a heating element contained in the heating chamber;

a closing mechanism configured to enclose the heating chamber and to press on a multi-well reaction vessel when the multi-well reaction vessel is received in the heating chamber; and a compliant thermally conductive insert positioned in the heating chamber in contact with the heating element, the compliant thermally conductive insert comprising an elastically deformable creped graphite sheet.

Example Q. The thermal cycler assembly of the preceding example, wherein the compliant thermally conductive insert comprises a plurality of layered elastically deformable creped graphite sheets.

Example R. The thermal cycler assembly of any one of the preceding examples, wherein the compliant thermally conductive insert comprises an interface frame connected with the elastically deformable creped graphite sheet that is removably insertable into the heating chamber and shaped to align the elastically deformable creped graphite sheet with the heating element and with the multi-well reaction vessel when the multi-well reaction vessel is inserted in the heating chamber.

Example S. The thermal cycler assembly of any one of the preceding examples, wherein the compliant thermally conductive insert has an uncompressed thickness in a range from 250 microns to 2000 microns and an in-plane thermal conductivity of at least 200 W/m-K, preferably at least 700 W/m-K.

Example T. The thermal cycler assembly of any one of the preceding examples, wherein the compliant thermally conductive insert has a through-plane thermal conductivity that increases nonlinearly with compressive stress, the through-plane thermal conductivity ranging from 1-5 W/m-K at 100 kPa compressive stress to 10-30 W/m-K at 700 kPa compressive stress, and is reversibly compressible to less than 60% of an original thickness in response to compressive stress of 700 kPa.

Example U. A method, comprising:

inserting a first multi-well reaction vessel into a heating chamber of a thermal cycler by placing the multi-well reaction vessel on a compliant thermally conductive insert on a heating element of the thermal cycler, the compliant thermally conductive insert comprising an elastically deformable creped graphite sheet;

compressing a first bottom surface of the first multi-well reaction vessel into the compliant thermally conductive insert such that pressure between the first bottom surface and the heating element causes reversible deformation of the creped graphite sheet according to a first compression profile;

inserting a second multi-well reaction vessel into the heating chamber of the thermal cycler by placing the second multi-well reaction vessel on the compliant thermally conductive insert; and compressing a second bottom surface of the second multi-well reaction vessel into the compliant thermally conductive insert such that pressure between the second bottom surface and the heating element causes reversible deformation of the creped graphite sheet according to a second compression profile that differs from the first compression profile, wherein the compliant thermally conductive insert reverts to an uncompressed state from the first compressed profile and from the second compressed profile without permanently deforming.

Example V. The method of the preceding example, further comprising:

thermally cycling the multi-well reaction vessel in the heating chamber by applying a controlled heat flux to the multi-well reaction vessel by the heating element through the compliant thermally conductive insert.

Example W. The method of any one of the preceding examples, further comprising:

aligning a well of the first or second multi-well reaction vessel with an acoustic emitter positioned to apply focused acoustic radiation from the acoustic emitter to samples contained in the wells of the multi-well reaction vessel;

emitting an interrogation toneburst from the acoustic emitter through a flat bottom surface of the first or second multi-well reaction vessel;

detecting an acoustic echo caused by the interrogation toneburst; and determining a parameter of a sample in the well from the detected acoustic echo.

Example X. The method of any one of the preceding examples, further comprising:

applying a heat flux from the heating element to the first or the second multi-well reaction vessel through the compliant thermally conductive insert sufficient to cause a temperature change of a sample in the first or the second multi-well reaction vessel of at least 1° C./s, preferably at least 1.5° C./s, preferably at least 2° C./s.

Example Y. The method of any one of the preceding examples, further comprising:

aligning a well of the first or second multi-well reaction vessel with an acoustic ejector positioned to apply focused acoustic radiation from the acoustic ejector to samples contained in the wells of the multi-well reaction vessel; and ejecting a droplet from the well by emitting an ejection toneburst from the acoustic ejector through a flat bottom surface of the first or second multi-well reaction vessel.

What is claimed is:

1. A system, comprising:

a robotic sample handler configured to retain and move a multi-well reaction vessel;

a thermal cycler comprising a heating chamber containing a heating element, a compliant thermally conductive insert comprising an elastically deformable creped graphite sheet positioned adjacent the heating element, and a closing mechanism, wherein the heating chamber is shaped to receive the multi-well reaction vessel and the closing mechanism is configured to press the multi-well reaction vessel toward the compliant thermally conductive insert and the heating element; and a controller operably connected with the robotic sample handler and thermal cycler, the controller comprising at least one processor and non-transitory memory containing executable instructions that, when executed by the at least one processor, configure the controller to:

cause the robotic sample handler to insert the multi-well reaction vessel into the thermal cycler;

cause the closing mechanism to enclose the multi-well reaction vessel in the heating chamber;

compress a bottom surface of the multi-well reaction vessel into the compliant thermally conductive insert by the closing mechanism; and thermally cycle the multi-well reaction vessel in the heating chamber by the heating element by applying a controlled heat flux to the multi-well reaction vessel from the heating element through the compliant thermally conductive insert.

2. The system of claim 1, wherein:

compressing the bottom surface of the multi-well reaction vessel into the compliant thermally conductive insert causes reversible deformation of the creped graphite sheet according to a first compression profile;

compressing a second bottom surface of a second multi-well reaction vessel into the compliant thermally conductive insert causes reversible deformation of the creped graphite sheet according to a second compression profile that is different from the first compression profile; and the compliant thermally conductive insert reverts to an uncompressed state from the first compressed profile and from the second compressed profile without permanently deforming.

3. The system of claim 1, further comprising:

a source vessel containing a reagent or sample; and an acoustic ejector comprising a transducer configured to emit focused acoustic radiation and an actuator configured to align the acoustic ejector and source vessel with wells of the multi-well reaction vessel, wherein the executable instructions, when executed by the at least one processor, further configure the controller to:

cause the actuator to selectively align the transducer and source vessel with one of the wells of the multi-well reaction vessel; and cause the acoustic ejector to eject one or more droplets from the source vessel to the well by applying the focused acoustic radiation to a sample contained in the source vessel.

4. The system of claim 1, further comprising:

a multi-well receiving vessel; and an acoustic ejector comprising a transducer configured to emit focused acoustic radiation and an actuator configured to align the acoustic ejector and the multi-well reaction vessel with wells of the multi-well receiving vessel, wherein the executable instructions, when executed by the at least one processor, further configure the controller to:

cause the actuator to selectively align the transducer and multi-well reaction vessel with one or more of the wells of the multi-well receiving vessel; and cause the acoustic ejector to eject one or more droplets from the multi-well reaction vessel to the wells of the multi-well receiving vessel by applying the focused acoustic radiation to samples contained in the multi-well reaction vessel.

5. The system of claim 1, further comprising:

an analyzer comprising a sample inlet; and an acoustic ejector comprising a transducer configured to emit focused acoustic radiation and an actuator configured to align the acoustic ejector and the multi-well reaction vessel with the sample inlet of the analyzer, wherein the executable instructions, when executed by the at least one processor, further configure the controller to:

cause the actuator to selectively align the transducer and multi-well reaction vessel with the sample inlet of the analyzer; and cause the acoustic ejector to eject one or more droplets from the multi-well reaction vessel to the sample inlet by applying the focused acoustic radiation to a sample contained in the multi-well reaction vessel.

6. A method, comprising:

inserting a multi-well reaction vessel into a heating chamber of a thermal cycler by placing the multi-well reaction vessel on a compliant thermally conductive insert on a heating element of the thermal cycler, the compliant thermally conductive insert comprising an elastically deformable creped graphite sheet;

enclosing the multi-well reaction vessel in the heating chamber; and compressing a bottom surface of the multi-well reaction vessel into the compliant thermally conductive insert to increase a thermal contact area between the bottom surface and the compliant thermally conductive insert; and thermally cycling the multi-well reaction vessel in the heating chamber by applying a controlled heat flux to the multi-well reaction vessel by the heating element through the compliant thermally conductive insert.

7. The method of claim 6, wherein the compliant thermally conductive insert has an uncompressed thickness in a range from 250 microns to 2000 microns.

8. The method of claim 6, wherein the compliant thermally conductive insert has an in-plane thermal conductivity of at least 200 W/m-K, preferably at least 700 W/m-K.

9. The method of claim 6, wherein the compliant thermally conductive insert has a through-plane thermal conductivity that increases nonlinearly with compressive stress, the through-plane thermal conductivity ranging from 1-5 W/m-K at 100 kPa compressive stress to 10-30 W/m-K at 700 kPa compressive stress.

10. The method of claim 6, wherein the compliant thermally conductive insert, when subjected to compressive stress of 700 kPa, reversibly compresses to less than 60% of an original thickness.

11. The method of claim 6, wherein the multi-well reaction vessel comprises a microplate comprising an array of wells having at least one flat bottom surface configured to permit acoustic auditing of a sample contained in the array of wells through the flat bottom surface, the method further comprising:

emitting an interrogation toneburst from an acoustic emitter through the flat bottom surface;

detecting an acoustic echo caused by the interrogation toneburst; and determining a parameter of the sample from the detected acoustic echo.

12. The method of claim 6, wherein thermally cycling the multi-well reaction vessel in the heating chamber comprises sequentially heating and cooling samples contained in the multi-well reaction vessel according to a PCR thermal cycle program at a heating or cooling rate of at least 1° C./s, or at least 1.5° C./s, preferably at least 2° C./s.

13. The method of claim 6, further comprising:

aligning one or more wells of the multi-well reaction vessel with a source well and an acoustic ejector positioned to acoustically eject fluid droplets from the source well; and ejecting one or more droplets from the source well to the wells of the multi-well reaction vessel by applying focused acoustic radiation from the acoustic ejector to a sample contained in the source well.

14. The method of claim 6, further comprising:

aligning one or more wells of the multi-well reaction vessel with an acoustic ejector positioned to acoustically eject fluid droplets from the multi-well reaction vessel and with a multi-well receiving vessel; and ejecting one or more droplets from wells of the multi-well reaction vessel to wells of the multi-well receiving vessel by applying focused acoustic radiation from the acoustic ejector to samples contained in the wells of the multi-well reaction vessel.

15. The method of claim 6, further comprising:

aligning a well of the multi-well reaction vessel with an acoustic ejector positioned to acoustically eject fluid droplets from the multi-well reaction vessel and with a sample inlet of an analytical device; and ejecting one or more droplets from the well of the multi-well reaction vessel to the sample inlet by applying focused acoustic radiation from the acoustic ejector to a sample contained in the well.

16. A thermal cycler assembly, comprising:

a heating chamber;

a heating element contained in the heating chamber;

a closing mechanism configured to enclose the heating chamber and to press on a multi-well reaction vessel when the multi-well reaction vessel is received in the heating chamber; and a compliant thermally conductive insert positioned in the heating chamber in contact with the heating element, the compliant thermally conductive insert comprising an elastically deformable creped graphite sheet.

17. The thermal cycler assembly of claim 16, wherein the compliant thermally conductive insert comprises layered elastically deformable creped graphite sheets.

18. The thermal cycler assembly of claim 16, wherein the compliant thermally conductive insert comprises an interface frame connected with the elastically deformable creped graphite sheet that is removably insertable into the heating chamber and shaped to align the elastically deformable creped graphite sheet with the heating element and with the multi-well reaction vessel when the multi-well reaction vessel is inserted in the heating chamber.

19. The thermal cycler assembly of claim 16, wherein the compliant thermally conductive insert has an uncompressed thickness in a range from 250 microns to 2000 microns and an in-plane thermal conductivity of at least 200 W/m-K, or at least 700 W/m-K.

20. The thermal cycler assembly of claim 16, wherein the compliant thermally conductive insert has a through-plane thermal conductivity that increases nonlinearly with compressive stress, the through-plane thermal conductivity ranging from 1-5 W/m-K at 100 kPa compressive stress to 10-30 W/m-K at 700 kPa compressive stress, and is reversibly compressible to less than 60% of an original thickness in response to compressive stress of 700 kPa.

* * * * *